Figure 1:
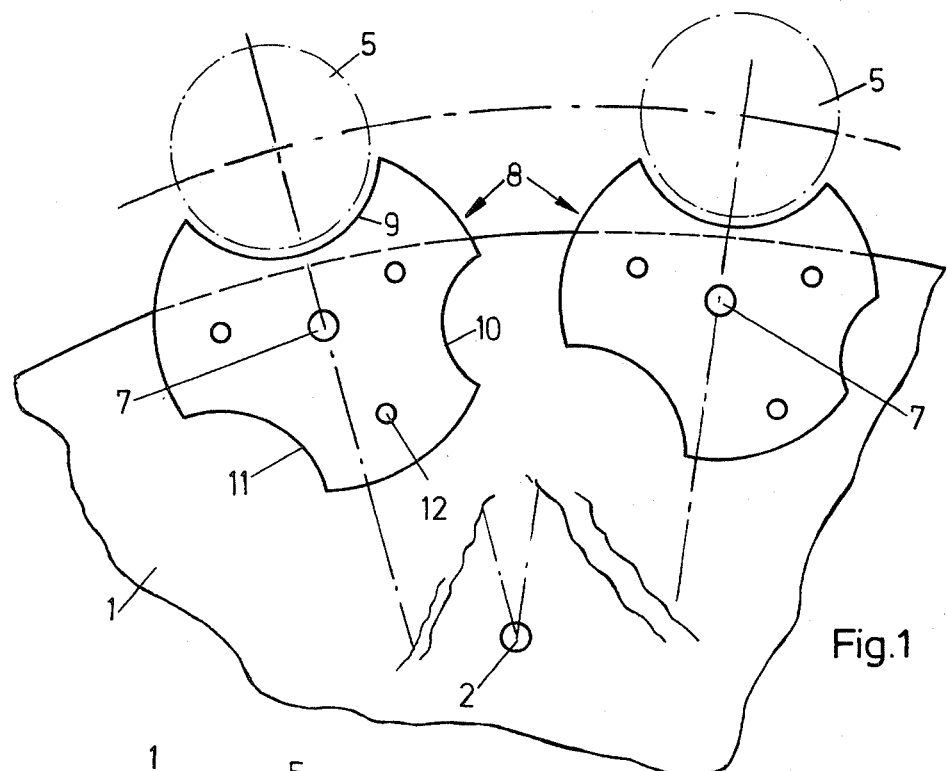

United States Patent [19]

Jörss

[11] Patent Number: 4,467,909

[45] Date of Patent: Aug. 28, 1984

[54] INFEED AND DISCHARGE STAR

[75] Inventor: Norbert Jörss, Neutraubling, Fed. Rep. of Germany

[73] Assignee: Pirzer Co., Neutraubling, Fed. Rep. of Germany

[21] Appl. No.: 429,984

[22] Filed: Sep. 30, 1982

[30] Foreign Application Priority Data

Nov. 3, 1981 [DE] Fed. Rep. of Germany ....... 3143511

[51] Int. Cl.³ .................... B65G 29/00; B65G 37/00; B65G 35/00; B65C 9/00
[52] U.S. Cl. .................... 198/481; 156/538; 156/567; 198/723
[58] Field of Search .................. 198/481, 653, 723; 156/538, 567, 569; 145/3.1, 3.31

[56] References Cited

U.S. PATENT DOCUMENTS

| 2,324,312 | 7/1943 | Meyer et al. | 198/481 |
| 2,528,860 | 11/1950 | Clark | 198/653 |
| 3,208,579 | 9/1965 | Perrier et al. | 198/653 |
| 3,710,928 | 1/1973 | Van Zijp | 198/653 |
| 3,743,123 | 7/1973 | Kinsbury | 221/226 |
| 3,823,050 | 7/1974 | La Mers | 156/521 |
| 3,952,784 | 4/1976 | Holland | 145/3.31 |

Primary Examiner—Edward C. Kimlin
Assistant Examiner—Merrell Cashion
Attorney, Agent, or Firm—Fred Wiviott

[57] ABSTRACT

An infeed or discharge star for transporting containers to a labeling or filling machine includes a rotating carrousel having a plurality of setting devices mounted in spaced apart relation adjacent its outer periphery. Each setting device comprises a member having rotatably mounted on the carrousel and having a plurality of arcuate surfaces formed in its outer margin. Each surface has a different radias of curvature for engaging containers of different sizes and means for locking the bodies with one of the surfaces selectively facing outwardly relative to the carrousel.

10 Claims, 5 Drawing Figures

INFEED AND DISCHARGE STAR

The invention pertains to infeed/discharge stars for labeling, filling and similar machines with in peripheral direction equidistant (machine division) cutouts for objects such as bottles, cans, jars and similar containers which are to be picked up by the infeed star and discharged by the discharge star.

Known infeed/discharge stars for labeling, filling and similar machines have permanent and unchangeable cutouts or recesses at the periphery of the star to pick up and transport bottles, cans, jars or similar containers.

In case of a different configuration of objects to be run, with a different diameter, the entire hub mounted star wheel/disc must be exchanged for another. In the case of high performance machines and consequently greater star diameters, the weight of such a star is considerable, so that exchanging star wheels/discs for a different configuration is troublesome and complicated. Furthermore an additional star wheel/disc with cutouts, corresponding with the change in configuration must be kept in stock. Changing such infeed and discharge stars is not only time consuming and troublesome, but are accompanied by additional expenses.

It is the task of the invention to design a mechanism for an infeed/discharge star with the help of which a change over can be made from one configuration to antoher without the need of changing the star wheel/disc or mounting plate, i.e. the form of the cutout at the periphery of each star of a changed form can be adapted to the different configuration of the object to be handled.

The invention related proposal is that setting devices, each time offset by one machine division, are mounted on a mounting disc of the infeed/discharge star, which setting devices have cutouts of different radii.

Further is proposed, in keeping with the invention that setting devices, offset by one machine division, are mounted on the mounting wheel/disc, which setting devices consist in each case of two crossed, arm shaped pickup members which are mounted so that they can pivot on a common section and connection point, and that both arm shaped pickup members can be operated on a scissor junction principle, whereby the pickup angle is changed.

With a further configuration of the invention, it is proposed that there are setting mechanisms, offset by one machine division, on the mounting wheel/disc in the vicinity of the periphery, which setting devices consist in each case of carrousels, mounted horizontally on the mounting wheel/disc. These carrousels have at their periphery cutouts or recesses which continuously change in radius, adapted to the different diameters of objects to be picked up/received and discharged.

With a change in configuration of objects to be handled e.g. a change over from bottles with one diameter to bottles with another, it is achieved with the invention related setting mechanism, that the desired cutout or recess at the edge of the mounting wheel/disc can be put ready for operation by means of a simple operation, such as shifting the setting mechanism. In this fashion changing of a star wheel/disc or the like is eliminated and the invention related star can be used for several configurations in steps or adapted infinitely variable to each diameter of the objects. The arrangement is made so, that either each individual setting mechanism can be shifted separately or that the total of setting mechanisms of the star can be shifted simultaneously from one central point, e.g. by means of a remote control.

The setting mechanisms which are attached to the mounting wheel/disc stand out from the peripheral edge of the mounting wheel/disc at least so far, that the distance from the center of the rotating body to the point of the cutout with the smallest diameter that lies radially farthest to the inside is greater that the distance of the point of rotation of the rotating body from the peripheral limit of the mounting wheel/disc, so that the objects to be handled do not come into contact with the periphery of the mounting wheel/disc. However, in a special case such contact may be desired. If so, there is no objection to change the above distance proportions accordingly.

In the case of the invention related configuration where the radius of the cutout is infinitely variable by means of crossed pickup members, a rotating body is not necessary for the setting mechanism. Such a configuration of the setting mechanism has for example the form of a pair of scissors. However, it is within the framework of this invention also possible to change the peripheral limit of the cutout concentrically or to arrange for a swivel mechanism in the center of the cutout. This swivel mechanism moves the left and right sections around the common swivel point toward each other and away from each other.

Here follows an explanation of the invention in conjunction with drawings of examples of configurations. These are the drawings:

FIG. 1 A schematic portrayal in top view of a cutout of an infeed/discharge star in keeping with the invention.

Figure 2:
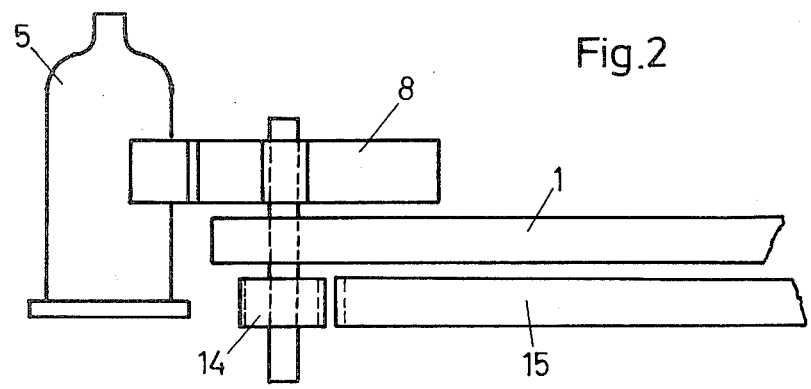

FIG. 2 A schematic portrayal in side view of the drive for a setting mechanism according to the invention.

Figure 3:
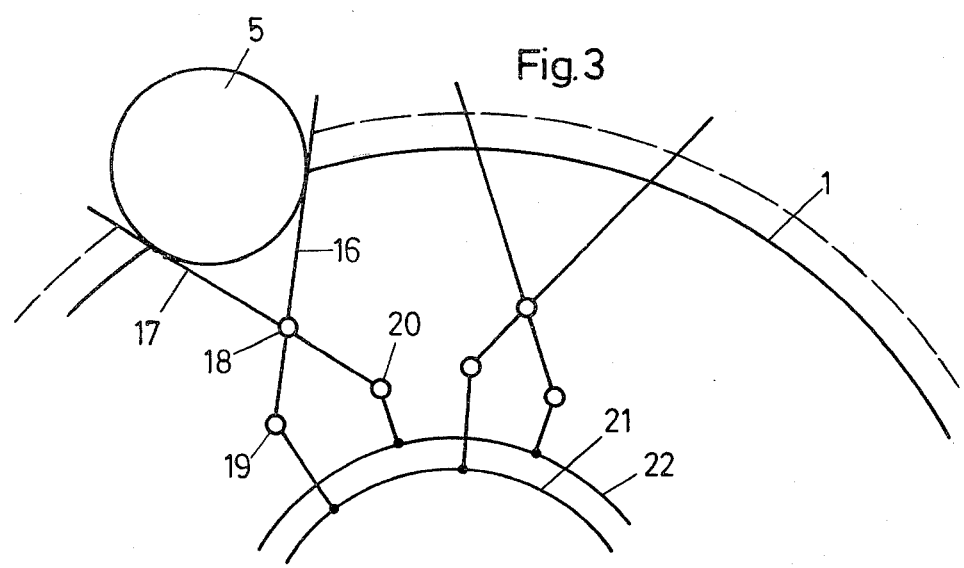

FIG. 3 A sectional portrayal of the principle of a further configuration of an infeed/discharge star in top view.

Figure 5:
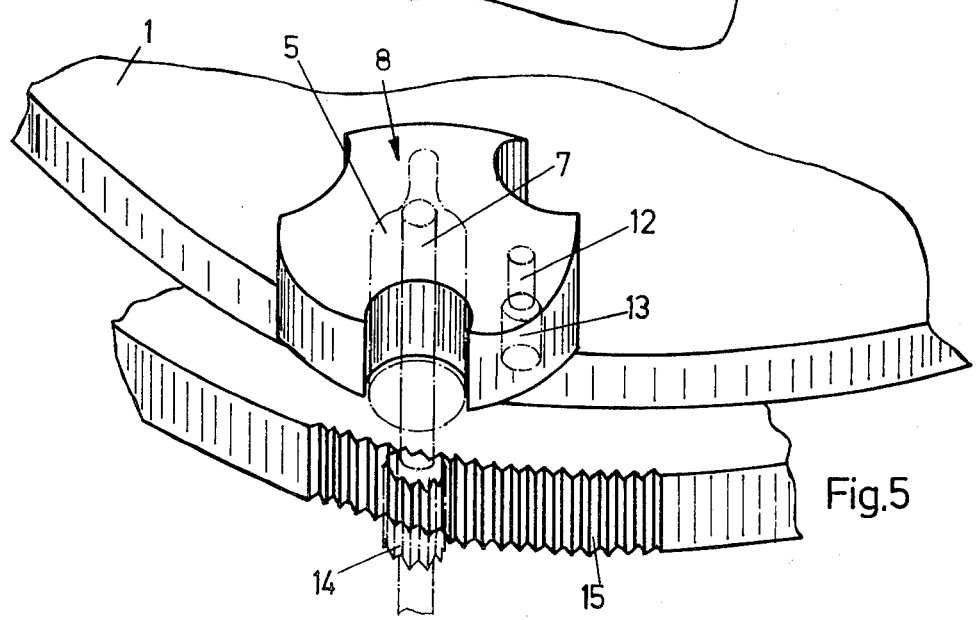
Figure 4:
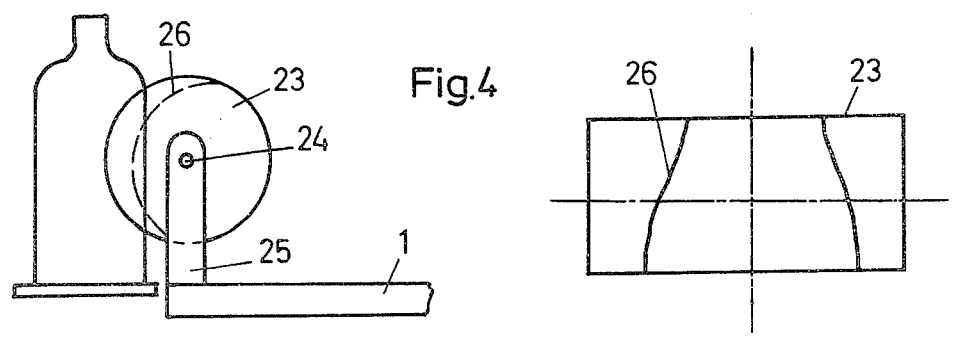

FIG. 4 A schematic portrayal in side view of a third configuration of the invention, and FIG. 5 A perspective view of a single rotating body as per FIG. 1 with drive.

A mounting wheel/disc 1 of the infeed/discharge star, which corresponds with a customary star wheel/disc, or is mounted on the same, is arranged so that it is driven circularly around the axle 2 of the star. The machine division is indicated by the number 3; this is the division by which two neighboring pickup positions at the periphery 4 of the mounting wheel/disc of the infeed/discharge star for the pickup and transport of the containers 5, e.g. bottles, cans, jars etc. are offset. At a short distance from the peripheral edge 4, rotating axles 7 are portrayed, which are arranged vertically to the mounting wheel/disc and accommodate the rotating bodies 8, which are portrayed in cylindrical form and have at their outer surface cutouts 9,10,11 each with a different radius. The value of the radius corresponds in each case with the diameter of the objects to be handled. However, the cutouts can also be in the form of a continuous, half ring shaped recess, so that a continuous setting can be possible for the required diameters of the objects to be handled. The distance of the axle 7 from the peripheral line 4 is chosen so, that the distance of the deepest point of the cutout with the largest diameter is greater than the distance of the peripheral line 4 from the rotating axle 7, in oder that the object 5 to be transferred does come into contact with the rotating body 8, but not with the mounting wheel/disc 1. The rotating body 8 can be fixed or arrested in the chosen position. This occurs e.g. in the fashion as indicated in FIG. 1, that there are on the rotating body 8 bolts or pins 12, which engage in the corresponding recesses 13 in the mounting wheel/disc 1. If desired however, the arresting can also be achieved in another fashion, whereby the arresting for rotating body 8 individually or all rotating bodies 8 simultaneously can be engaged or disengaged.

The rotating body 8 is arranged on the mounting wheel/disc 1 so, that it can rotate around the axle or can be set infinitely variable, in order that each cutout 9,10, or 11 can be arranged at the outer edge of the mounting wheel/disc in desired fashion and then forms the desired cutout. In which instance each rotating body 8 can be turned individually (in the present case by 120°) or all rotating bodies 8 on the mounting wheel/disc can be rotated simultaneously by a drive system 14,15 so that the setting of all rotating bodies 8 can take place simultaneously and can e.g. be disengaged by means of remote control, whereby a drive motor, which is not depicted, rotates a toothed drive disc/wheel 15, by a certain angle which results in a rotation of the rotating bodies 8 by a desired angle of e.g. 120°. This toothed drive wheel/disc meshes with the pinions 14 which are at each axle 7 of the rotating bodies 8. The kind of drive that rotates the rotating bodies 8 is for this invention not decisive, so that the rotation of the rotating bodies in an other position can also be brought about by mechanical, hydraulic or pneumatic means.

In the case of the configuration in FIG. 3, the setting mechanism, in contrast with its configuration as in FIG. 1 and 2, is not depicted as rotating bodies but as a scissor type mechanism. The angle for the reception of the object to be received or transferred is changed by opening or closing this scissor type mechanism. In this case each cutout on the mounting wheel/disc 1 is formed by a pair of arms 16,17 which are crossing each other and are at the crossing point 18 linked to each other. The scissors thus formed are opening and closing as follows. A drive mechanism (not depicted) is connected at the radially inward lying extreme ends of the arms 16,17 as well as at the positions 19,20 and moves, when it is operated, the arms 16,17 towards each other or away from each other. Consequently the radially outward lying parts of the scissors enclose a smaller, respectively larger open angle and thus objects of smaller or greater diameter can be grasped. The operation of the scissors can also be as e.g. in FIG. 3, namely that all arms 16 are joined to a common connection and all arms 17 are joined to another and that the common connections 21,22 are rotated in opposite directions, when the angle of opening of the scissors over the entire mounting wheel/disc 1 should be changed as a whole. The arms 16,17 are arrested in each set position. In the case of the configuration in FIG. 4 the rotating bodies 23 have a horizontal axle 24. Each rotating body 23, preferably cylindrical in form is positioned in vertical supporting arms which are connected with the supporting frame 1 and on the outer surface of the rotating body 23 is at least one recess 26 which is in cross section somewhat circular or half circular in shape, which recess 26, running in the direction of the periphery, increases or decreases in radius. This increase or decrease can be continuous or discontinuous. In case of the special configuration as in FIG. 4 the recess 26 is from the center of the cylinder 23 (at both sides) running symmetrically on the outer surface and is uniformly increasing or decreasing in radius in peripheral direction, so that by means of rotation of the rotating body 23 a indefinitely variable change in the radius of the recess or cutout 26 can be achieved and thus an adaptation to the different radii of the objects to be handled. The recess on the outer surface of the rotating body 23 can, however, also be divided up into several individual recesses, so that by means of rotation or setting of the rotating body 23 around the axle 24, similar to the case of the rotating bodies as in the configuration of FIGS. 1 and 2, cutouts of different depth can be so positioned, that they form the cutouts of the infeed/discharge star.

IN CONCLUSION

On the mounting wheel/disc of an infeed/discharge start for labeling, filling or similar machines are, in the vicinity of the mounting wheel/disc setting mechanisms which are offset by one machine division, which setting mechanisms allow for the acceptance of objects such as bottles, cans, jars and the like of different diameters. These setting mechanisms are either in the form of a rotating body which continuous or discontinuous cutouts on its outer surface or as scissor like holding devices, of which the angle of opening is adjustable so that by means of such an adjustment objects of different diameters can be accepted. The rotating bodies that have cutouts can be set by means of a vertical or horizontal axle. When changing over from one container to a second with a different diameter, the rotating body is merely turned by a certain angle to the cutout that corresponds with the diameter of that second container and is arrested in the desired position. Thus changing complete stars is eliminated in the case of conventional machines, when a different container must be run.

NOTE: In case of discrepancies between the original, German text and its English translation, the original, German text shall be binding.

I claim:

1. An infeed or discharge start for engaging containers and for transporting the same to or from a labeling or filling station, said star including a carrousel rotatably mounted about a first axis and having an outer periphery, a plurality of setting devices mounted in spaced apart relation adjacent the periphery of the carrousel, the improvement wherein each setting device is rotatably mounted on the carrousel and includes a plurality of arcuate surfaces each having a different radius of curvature for engaging containers of different sizes.

2. The invention set forth in claim 1 and including means for locking each setting device in alternate positions wherein selected ones of the respective arcuate surfaces are presented outwardly.

3. The invention set forth in claim 2 wherein and including drive means for simultaneously rotating the setting devices so that corresponding surfaces on each may be presented outwardly simultaneously.

4. The invention set forth in claim 3 wherein each setting devices is mounted on the carrousel for rotation about an axis parallel to the rotational axis of the other setting devices.

5. The invention set forth in claim 4 wherein each setting device has three arcuate surfaces spaced around its periphery and each having a different radius of curvature.

6. The invention set forth in claim 5 wherein said drive means includes a gear mounted adjacent said carrousel and a pinion coupled to each body and engaging said gear whereby said bodies will be rotated simultaneously upon rotation of said gear.

7. The invention set forth in claim 1 wherein and including drive means for simultaneously rotating the setting devices so that corresponding surfaces on each may be presented outwardly simultaneously.

8. The invention set forth in claim 7 wherein said drive means includes a gear mounted adjacent said carrousel and a pinion coupled to each body and engaging said gear whereby said bodies will be rotated simultaneously upon rotation of said gear.

9. The invention set forth in claim 1 wherein each setting devices is mounted on the carrousel for rotation about an axis parallel to the rotational axis of the other setting devices.

10. The invention set forth in claim 9 wherein each body has three arcuate surfaces spaced around its periphery and each having a different radius of curvature.

* * * * *